(12) United States Patent
Giachero

(10) Patent No.: US 10,280,002 B2
(45) Date of Patent: May 7, 2019

(54) COLUMN FOR EQUIPMENT FOR STACKING AND TRANSPORTING PILED-UP ARTICLES

(71) Applicant: Ferrero S.p.A., Casalgrasso (Cuneo) (IT)

(72) Inventor: Fabrizio Giachero, Casalgrasso (IT)

(73) Assignee: FERRERO S.P.A., Casalgrasso (Cuneo) (IT)

(*) Notice: Subject to any disclaimer, the term of this patent is extended or adjusted under 35 U.S.C. 154(b) by 0 days.

(21) Appl. No.: 16/127,725

(22) Filed: Sep. 11, 2018

(65) Prior Publication Data

US 2019/0077602 A1  Mar. 14, 2019

(30) Foreign Application Priority Data

Sep. 12, 2017 (IT) .................. 102017000102029

(51) Int. Cl.
*B65G 1/14* (2006.01)
*B65D 90/00* (2006.01)

(52) U.S. Cl.
CPC ............ *B65G 1/14* (2013.01); *B65D 90/0073* (2013.01)

(58) Field of Classification Search
CPC ......... B65G 1/02; B65G 1/14; B65D 90/0073
USPC ........................................................ 211/150
See application file for complete search history.

(56) References Cited

U.S. PATENT DOCUMENTS

| | | | | |
|---|---|---|---|---|
| 3,384,266 A | * | 5/1968 | Schuller | A47F 1/04 221/90 |
| 4,712,691 A | * | 12/1987 | Grill | B65G 1/14 211/150 |
| 5,301,824 A | * | 4/1994 | Schoeller | B65G 1/14 211/150 |
| 5,411,234 A | * | 5/1995 | Schoeller | B65G 1/14 187/213 |
| 5,938,051 A | * | 8/1999 | Scholler | B65G 1/14 211/150 |
| 5,988,777 A | * | 11/1999 | Schoeller | B65G 1/14 211/41.1 |

(Continued)

FOREIGN PATENT DOCUMENTS

| | | | | |
|---|---|---|---|---|
| DE | 3536251 C1 | * | 12/1986 | ............... B65G 1/14 |
| DE | 3807663 A1 | * | 9/1989 | ............... B65G 1/14 |

(Continued)

OTHER PUBLICATIONS

Search Report for Italian Application No. 102017000102029 completed on May 16, 2018.

*Primary Examiner* — Stanton L Krycinski
(74) *Attorney, Agent, or Firm* — Heslin Rothenberg Farley & Mesiti P.C.; Victor A. Cardona, Esq.

(57) ABSTRACT

A column for equipment for stacking and transporting piled-up and vertically separated articles includes a plurality of superimposed swingable brackets suitable to support the articles and associated to respective counter-weights. The central section of each of the brackets has a pair of ears for a pivot pin and a pair of stop fins inserted in respective grooves provided for on the body of the column. The rear section of each of the brackets is provided with at least one lateral appendage coupled with two counter-weights one of which is connected to the lateral appendage of the underlying bracket and the other of which is connected to the lateral appendage of the overlying bracket.

15 Claims, 6 Drawing Sheets

(56) References Cited

U.S. PATENT DOCUMENTS

| | | | | |
|---|---|---|---|---|
| 6,223,911 | B1 * | 5/2001 | Weaver | A47B 47/027 211/150 |
| 6,234,743 | B1 * | 5/2001 | Strobel | B65G 1/14 211/150 |
| 6,405,883 | B1 * | 6/2002 | Schambach | B65G 1/14 211/150 |
| 7,210,892 | B2 * | 5/2007 | Strobel | B65G 1/14 211/150 |
| 7,347,654 | B2 * | 3/2008 | Mondejar Jimenez | B65G 1/14 410/32 |
| 7,878,343 | B2 * | 2/2011 | Strobel | B65G 1/14 211/150 |
| 8,496,127 | B2 * | 7/2013 | Strobel | B65G 1/14 211/150 |
| 9,022,371 | B2 * | 5/2015 | Seghezzi | B65G 1/14 211/57.1 |
| 9,206,656 | B2 * | 12/2015 | Roodenburg | A47F 7/0028 |
| 2006/0226102 | A1 * | 10/2006 | Strobel | B65G 1/14 211/150 |
| 2007/0152544 | A1 * | 7/2007 | Strobel | B65G 1/14 312/9.58 |

FOREIGN PATENT DOCUMENTS

| | | | | |
|---|---|---|---|---|
| DE | 3808338 | A1 * | 9/1989 | B65G 1/14 |
| DE | 4124045 | A1 * | 1/1993 | B65G 1/14 |
| DE | 9318410 | U1 * | 2/1994 | B65G 1/14 |
| DE | 29704692 | U1 * | 7/1997 | B65G 1/14 |
| DE | 29708323 | U1 * | 10/1997 | B65G 1/14 |
| DE | 19617518 | A1 * | 11/1997 | B65D 19/44 |
| DE | 19641270 | A1 * | 4/1998 | B65G 1/14 |
| DE | 10142211 | A1 * | 3/2003 | B65D 1/14 |
| DE | 10249629 | A1 * | 5/2004 | B65G 1/14 |
| DE | 10300583 | A1 * | 7/2004 | B65G 1/14 |
| DE | 10320566 | B3 * | 12/2004 | B65G 1/14 |
| DE | 202004019245 | U1 | 8/2005 | |
| DE | 102004033216 | A1 * | 2/2006 | B65G 1/14 |
| DE | 202006005086 | U1 | 6/2006 | |
| DE | 102005025813 | A1 * | 12/2006 | B65G 1/14 |
| DE | 202009006057 | U1 | 7/2009 | |
| DE | 102010028214 | A1 * | 11/2010 | B65G 1/14 |
| DE | 102009046063 | A1 * | 5/2011 | B65G 1/14 |
| DE | 202013100674 | U1 * | 4/2013 | B65G 1/14 |
| DE | 202016000929 | U1 * | 2/2016 | B65G 1/14 |
| EP | 0192613 | A2 * | 8/1986 | B65G 1/14 |
| EP | 0604337 | A1 * | 6/1994 | B65G 1/14 |
| EP | 0613837 | A1 | 9/1994 | |
| EP | 1340697 | A1 * | 9/2003 | B65G 1/14 |
| EP | 1505010 | A1 | 2/2005 | |
| EP | 2022733 | A1 * | 2/2009 | B65G 1/14 |
| EP | 2305580 | A2 * | 4/2011 | B65G 1/14 |
| FR | 2631004 | A1 * | 11/1989 | B65G 1/14 |
| FR | 2851553 | A1 * | 8/2004 | B65D 85/62 |
| FR | 2909985 | A1 * | 6/2008 | B65G 1/14 |
| WO | WO-2006131300 | A1 * | 12/2006 | B65G 1/14 |
| WO | WO-2007118634 | A1 * | 10/2007 | B65G 1/14 |
| WO | WO-2008122307 | A1 * | 10/2008 | B65G 1/14 |
| WO | WO-2009156116 | A1 * | 12/2009 | B65G 1/14 |
| WO | WO-2011003619 | A1 * | 1/2011 | B65G 1/14 |

* cited by examiner

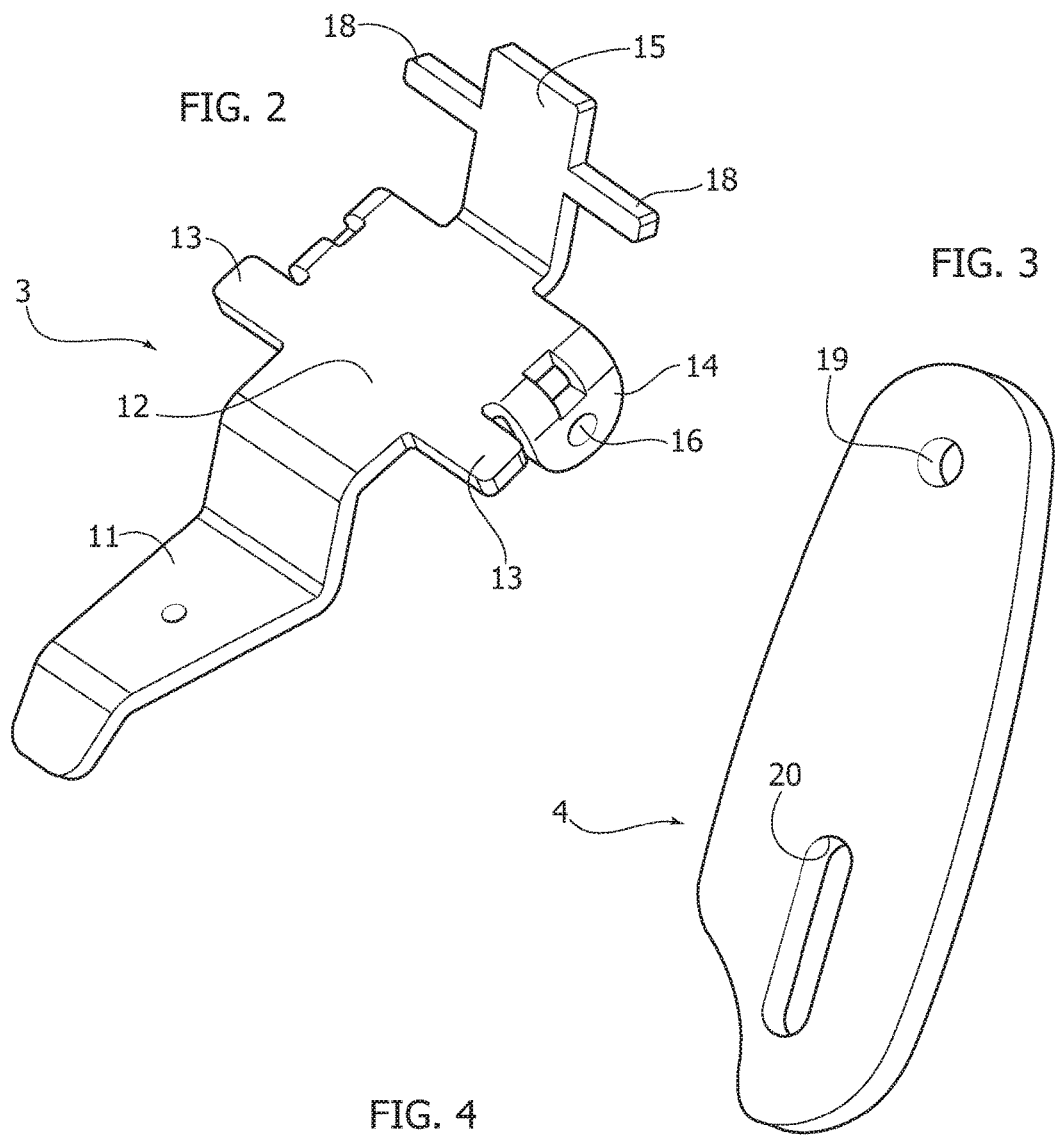
FIG. 2
FIG. 3
FIG. 4
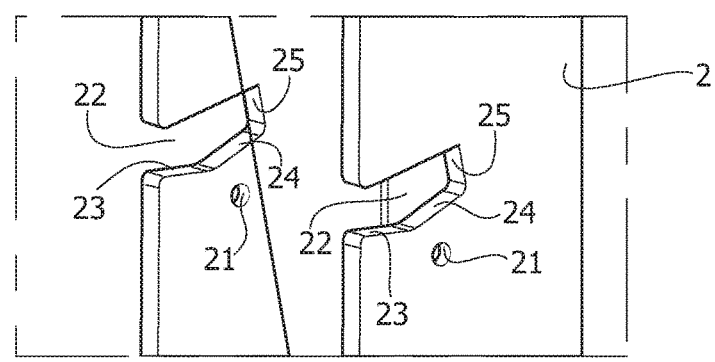

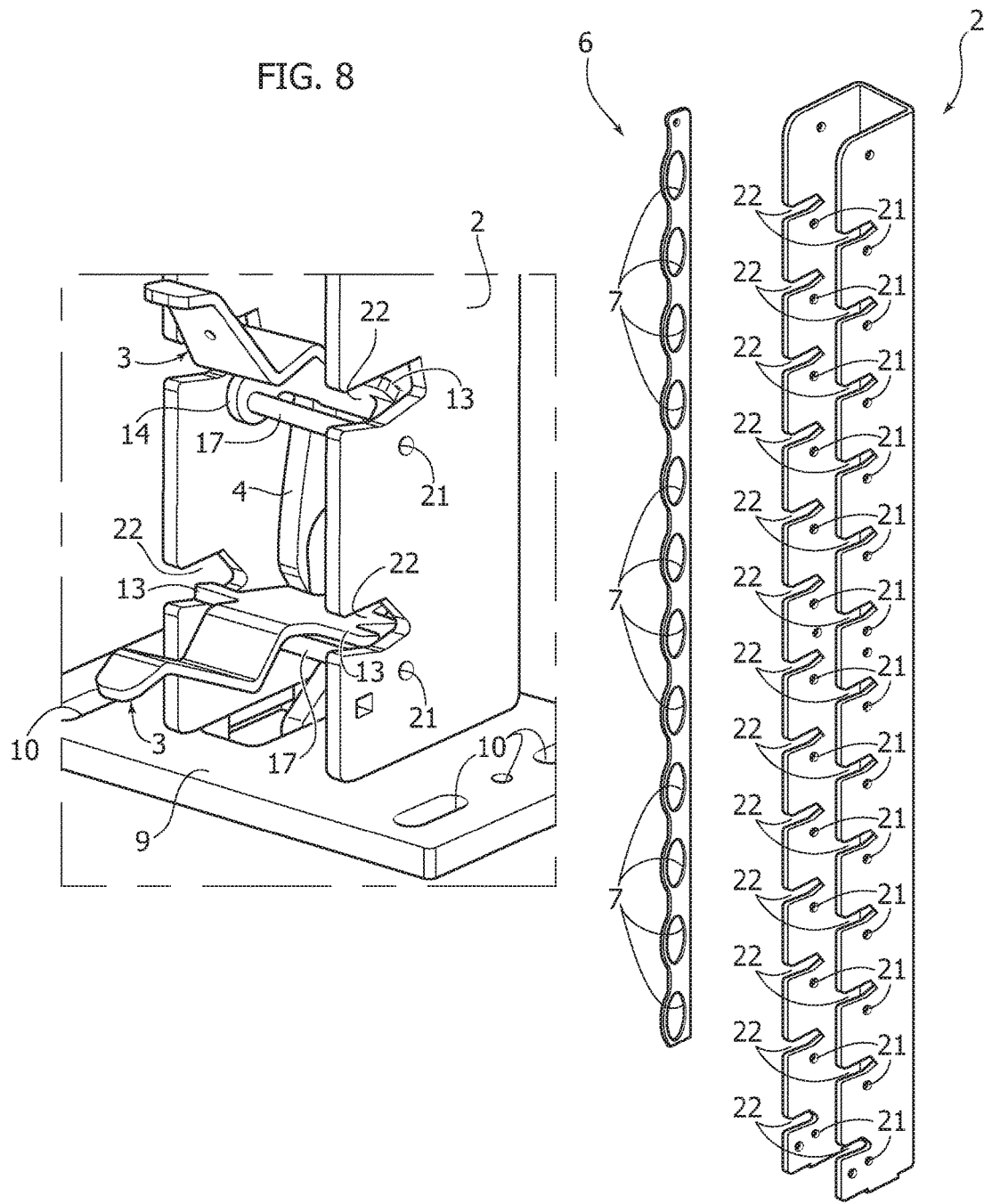

COLUMN FOR EQUIPMENT FOR STACKING AND TRANSPORTING PILED-UP ARTICLES

CROSS REFERENCE TO RELATED APPLICATIONS

This application claims priority from Italian Patent Application No. 102017000102029 filed on Sep. 12, 2017, the entire disclosure of which is incorporated herein by reference.

FIELD OF THE INVENTION

The present invention regards a column for equipment for stacking and transporting piled-up and separated articles, in particular equipment comprising two or more columns of the type in which for each column there is provided for a plurality of superimposed swingable brackets suitable to support stacked articles, for example components of vehicle bodies, separated from each other vertically.

Often, the manufacturing of components to be assembled in a production line, especially in the automotive industry, occurs in different factories with respect to where the assembly line is located. Furthermore, increasingly frequently, the assembly of components in an assembly line occurs in an automated manner, for example by means of robotic arms which pick up one article at a time from a storage container.

Thus, there arises the need for containers provided with equipment for stacking and transporting a group of superimposed and vertically separated components capable of enabling them to be transported in a safe and reliable manner and that is simultaneously compatible with the automated assembly means of a production line.

STATE OF THE PRIOR ART

Typically, these transportation containers consist of metal structures of various shapes and sizes provided with column-like equipment mentioned above.

Such columns usually comprise a channel-shaped body and a plurality of superimposed swingable brackets suitable to support the articles. Such brackets are formed by a front section on which the articles are placed, a central section for coupling with the body of the column, and a rear section.

The principle of operation of the columns is based on the sequential loading and unloading of the articles which are placed on the brackets mechanically or manually.

The rotation of each bracket during the loading step can be divided into three steps. The brackets are initially in a retracted inoperative position, in which they are substantially contained in the body of the column. When the article is placed on a bracket, the contiguous bracket takes an intermediate pre-loading position, in which its front section, or section for supporting the articles, is partially projecting from the body of the column to receive the subsequent article that should be stacked and which, in turn, will rotate the bracket to an extracted loading position and the contiguous bracket to the pre-loading position.

During the unloading step, the bracket corresponding to the article that is removed returns to the initial inoperative position due to a counter-weights or springs system. Thus, actuator means are provided for controlling the rotation of each bracket from the retracted position to the intermediate pre-loading position by a contiguous bracket, and means for returning the bracket towards the retracted inoperative position.

Document EP-1505010 refers to automated structures for the storage and displacement of articles comprising columns provided with a plurality of swingable brackets. Each of the brackets is provided with at least one metal spring suitable to return the bracket to the inoperative position once the article is removed. In an embodiment, the springs can be replaced by counter-weights formed on the rear section of the brackets. The connection between the brackets occurs by means of a rod slidably engaged with projections provided laterally in the front section of each bracket, or in the section opposite to the counter-weight with respect to the rotation axis.

EP 0613837 describes columns provided with swingable brackets provided with torsion springs at the rotation axis suitable to return each bracket to the inoperative position.

DE 202009006057 refers to columns of the type described above wherein each bracket is connected to the overlying one by means of a rod pivoted by means of a slot to a pin provided at the joint between the central portion and the front portion of the bracket. Furthermore, a counter-weight or a spring is provided in the rear section of each bracket.

DE 202006005086U1 describes a column generally corresponding to the pre-characterising part of claim 1.

SUMMARY OF THE INVENTION

The object of the invention is to provide a column for equipment for stacking and transporting piled-up articles, of the type specified above that is simple, cost-effective and functional with respect to the prior art.

According to the invention, this object is mainly attained due to the fact that, in accordance with claim 1, the central section of each of the brackets has a pair of stop fins coplanar to the central section, each one of which is inserted in a respective groove provided on the body of the column. The groove has an initial section with a lower surface substantially horizontal against which the stop fin rests in the loading position of the bracket, an end section with a vertical surface against which the stop fin rests in the inoperative position of the bracket, and a chute-like intermediate section which allows the fin to pass through during the rotation of the bracket between the inoperative and loading positions.

Furthermore, the rear section of each of the brackets is provided with at least one lateral appendage coupled to actuator means for controlling the rotation of the bracket from the retracted position to the intermediate pre-loading position by a contiguous bracket.

The means for returning each bracket towards the retracted inoperative position can consist of counter-weights or springs. In the first case, there can be provided for two counter-weights each one of which has a lower slot and an upper hole, and a first counter-weight or lower counter-weight is connected to the lateral appendage of the bracket by means of the respective upper hole and to the lateral appendage of the underlying bracket by means of the respective lower slot. A second counter-weight or upper counter-weight is connected to the lateral appendage of the bracket by means of the respective lower slot and to the lateral appendage of the overlying bracket by means of the respective upper hole.

In the body of the column there may be provided for a slidable longitudinal bar having a row of openings which, in a raised locking position of the bar, are engaged with the lateral appendage of each bracket so as to prevent the movement thereof in the loading position.

The column according to the invention is inexpensive to manufacture by minimising the number of components and simplifying the machining thereof, easy to assemble and it is highly reliable over time.

The columns according to the invention can be used with equipment for stacking and transporting articles according to different configurations: the columns can be vertical and in this case the brackets in said extracted position extend horizontally. Or the columns are horizontal and the brackets in said extracted position can extend horizontally or vertically. The columns can also be inclined and in this case the brackets in said extracted position extend vertically.

BRIEF DESCRIPTION OF THE DRAWINGS

The invention will now be described in detail, purely by way of non-limiting example, with reference to the attached drawings, wherein:

FIG. 2 is a perspective view and in larger scale, of a swingable bracket of the column according to the invention, FIG. 3 is a schematic perspective view of one of the counter-weights of the column according to the invention, FIG. 4 is an enlarged perspective view of a detail of the column according to the invention, FIG. 8 shows another part of FIG. 6 in larger scale, FIG. 9 is an exploded perspective view showing the body and the longitudinal bar of the column according to the invention.

DETAILED DESCRIPTION OF THE INVENTION

Figure 1:
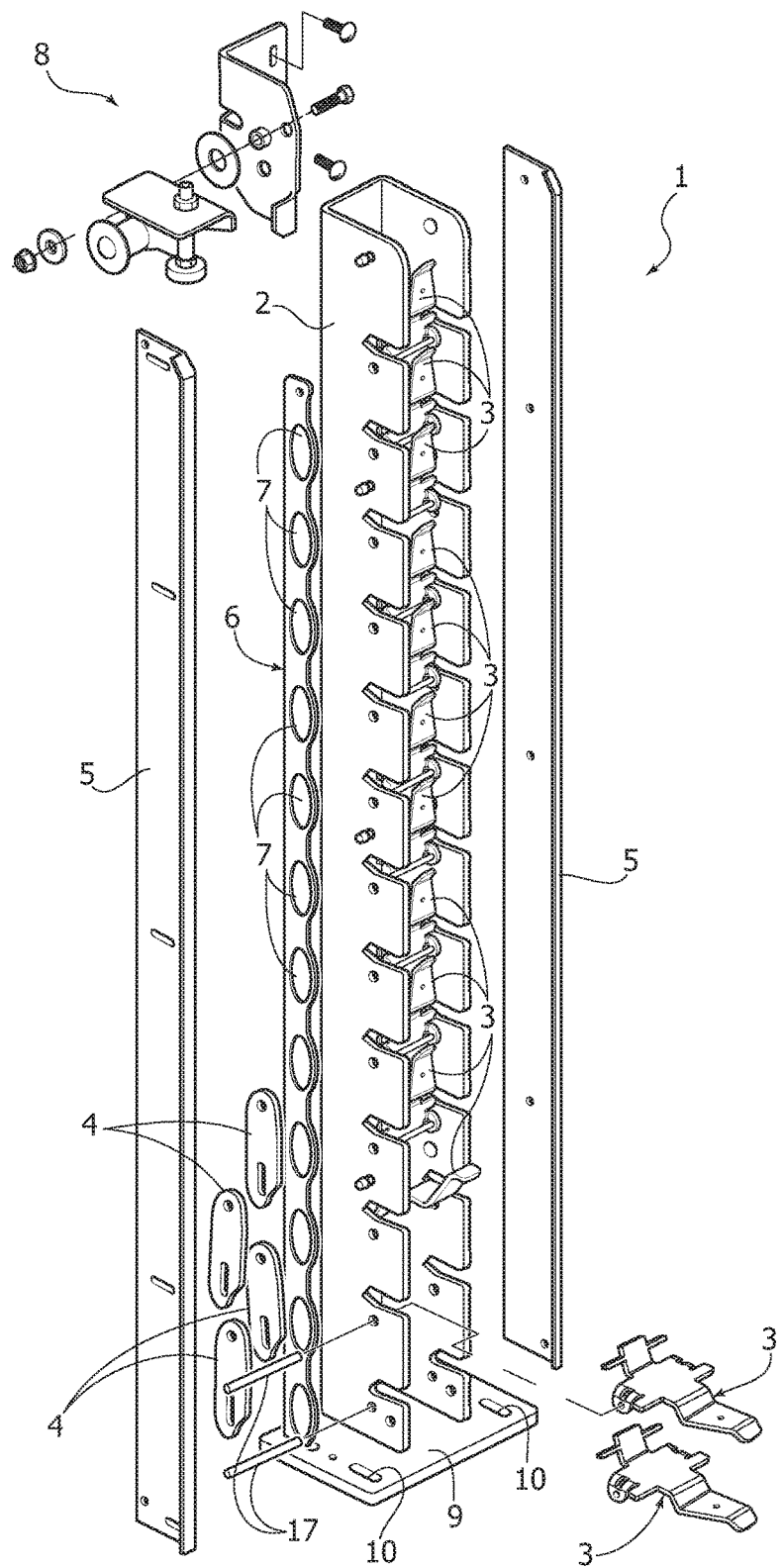
FIG. 1 is an exploded schematic perspective view of an example of a column for equipment for stacking and transporting piled-up articles according to the invention.
Figure 5:
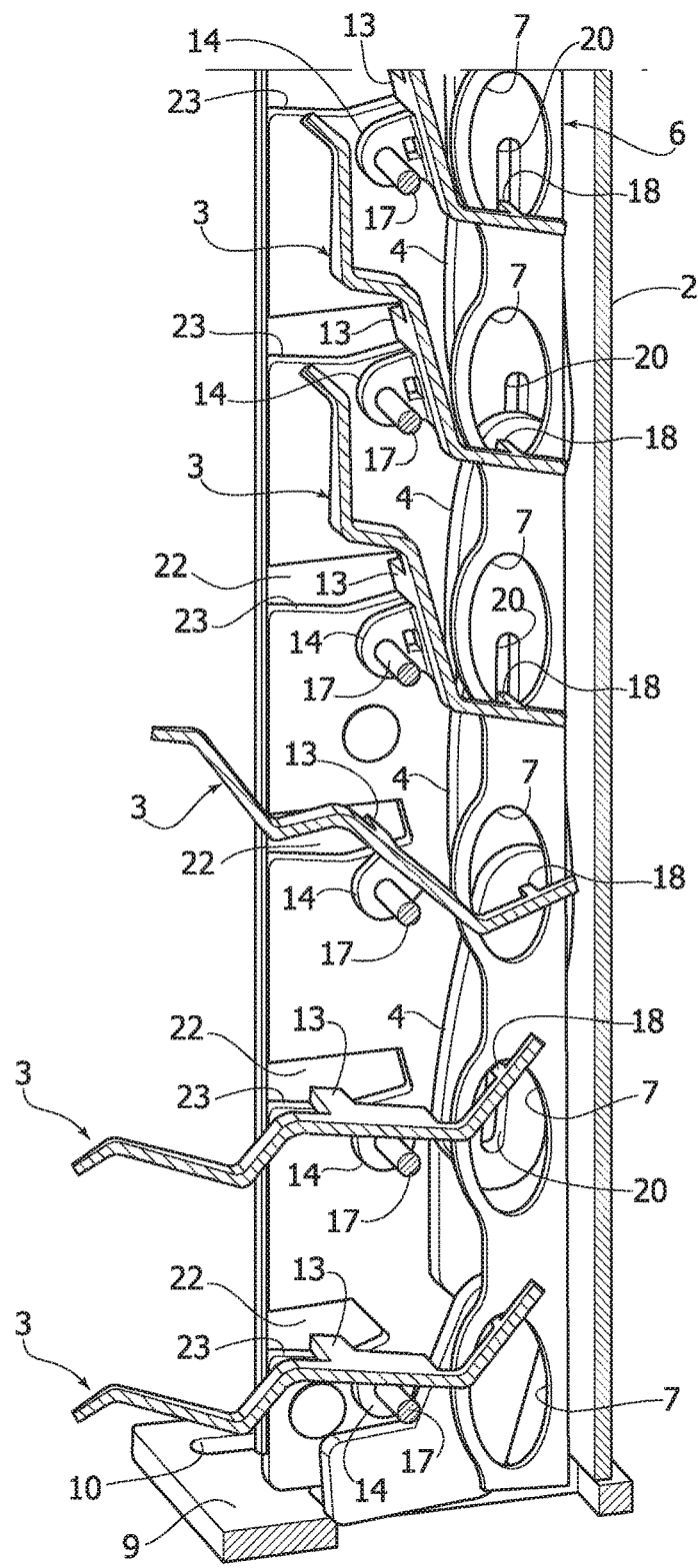
FIG. 5 is a longitudinal sectional view and in larger scale, of a portion of the column according to the invention.

Initially referring to FIG. 1, a column for equipment for stacking and transporting piled-up articles is indicated in its entirety with 1 and it comprises, in a generally known manner, a channel-shaped body 2 in which there are housed—in a superimposed manner—a plurality of swingable brackets 3, each coupled with two counter-weights 4 as will be described hereinafter. A pair of containment sheets 5 is applied to the lateral walls of the body 2 and a longitudinal bar 6 having a row of openings 7 can be provided between one of the lateral walls of the body 2 and the corresponding containment sheet 5. A locking system 8 of the pieces is provided on the top part of the column 1. The column 1 can be fixed to the floor of a container by means of a base 9 provided with holes and slots 10 for the bolts (not shown) to pass through.

As observable in FIG. 2, each bracket 3 has a front section 11 which serves to support the articles (not shown), for example parts of a vehicle body. The shape of this front section 11 is purely indicative and may vary as a function of the type and characteristics of the article it is designated to support. Furthermore, there may be provided a layer for covering said front section 11, not shown, made of anti-skid and/or anti-scratch material such as for example rubber or plastic material. Alternatively, the front section 11 can be galvanised or made of stainless steel.

According to a distinctive characteristic of the invention, the bracket 3 is formed with a substantially sheet-like central section 12 having—on the lateral edges thereof—a pair of stop fins 13 in proximity of the joining with the front section 11, and a pair of ears 14 projecting downwards adjacent to the joining with a rear section 15. The ears 14 are provided with holes 16 through which there is inserted a pivot pin 17 for the rotatable coupling of the bracket 3 with the body 2, according to the methods described hereinafter.

The rear section 15 of the bracket 3, also generally sheet-like, has a pair of lateral appendages 18 at least one of which is designed to be coupled with two counter-weights 4, one of which is illustrated in FIG. 3. The rear section 15 can be inclined with respect to the central section 12.

The counter-weights 4 generally have an elongated shape and are provided with an upper hole 19 and a lower slot 20 aligned with the upper hole 19.

FIG. 4 shows in detail a portion of the column 1 which supports the swingable brackets 3. In particular, on the lateral walls of the body 2 there are provided a pair of lower holes 21 and a corresponding pair of upper grooves 22 for each bracket 3. The grooves 22 are formed with an initial section having a substantially horizontal lower surface 23, a slanting chute intermediate section 24 and an end section with a vertical surface 25.

Now, with reference to figure, 5 in which there is shown a section of a portion of the column 1 according to the invention, each bracket 3 is normally housed in the body 2 with the pivot pin 17 of the pair of ears 14 inserted into the respective pair of holes 21 of the body 2 and the stop fins 13 inserted into the respective pair of grooves 22.

As better observable in FIG. 9, pairs of lower holes 21 and corresponding upper grooves 22 are provided uniformly over the entire length of the column 1 at pre-set intervals and, thus, the brackets 3 are equally spaced from each other.

For every pair of counter-weights 4, a lower counter-weight 4 is connected to one of the lateral appendages 18 of a respective bracket 3 by means of the relative upper hole 19, and to the corresponding lateral appendage 18 of the underlying bracket 3 by means of the relative lower slot 20. In the embodiment shown in the drawings, an upper counter-weight 4 is connected to the lateral appendage 18 of the bracket 3 by means of the respective lower slot 20 and to the corresponding lateral appendage 18 of the overlying bracket 3 by means of the respective upper hole 19. In an alternative embodiment of the invention, not illustrated in the drawings, upper and lower counter-weights 4-4 can be applied to both lateral appendages 18 of each bracket 3.

Thus, each of the brackets 3, excluding the lower one and the upper one of the pile, is connected both to the overlying bracket 3 and to the underlying bracket 3 by means of respective counter-weights 4.

Figure 6:
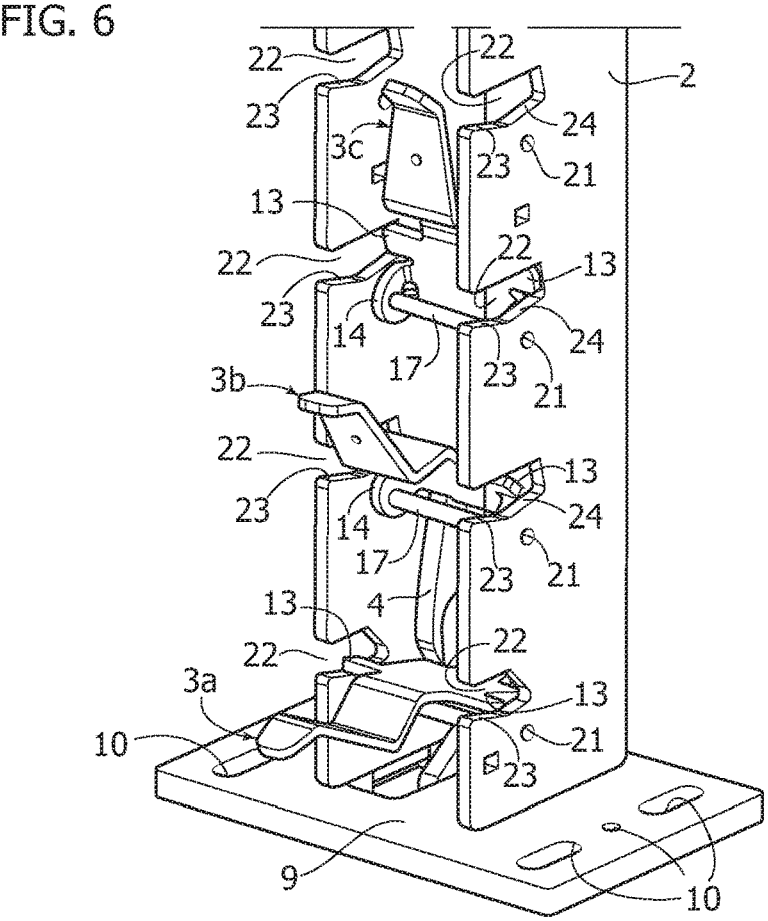
FIG. 6 is a perspective view of the lower portion of the column.

As shown in FIG. 6, each bracket 3 can rotate around its pivot pin 17 between a raised substantially vertical inoperative position, in which it is substantially contained in the body 2, an inclined intermediate pre-loading position in which the front section 11 of the bracket 3 is partly projecting from the body 2 to receive an article, and a substantially horizontal loading position in which the front section 11 is projecting from the body 2 to support the article.

In the initial configuration of the column 1, in the absence of stacked articles, all brackets 3 are in the raised inoperative position except for the lower one of the pile which is arranged in the pre-loading position.

Figure 7:
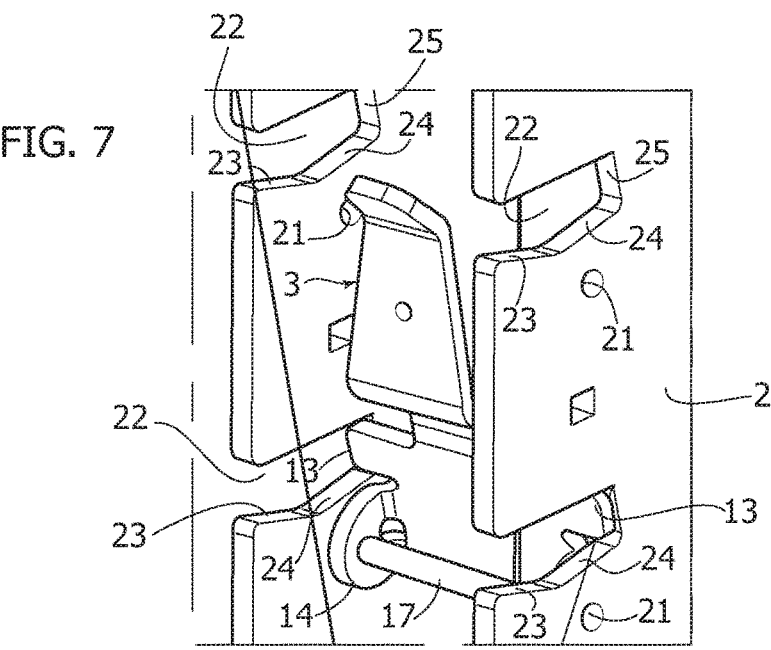
FIG. 7 shows a portion of FIG. 6 in larger scale.

As better observable in FIG. 7, in the raised position the pair of stop fins 13 of each bracket 3 rests on the vertical surfaces 25 of the end sections of the respective grooves 22, thus determining the upper stop position of the rotation of the bracket 3. Such raised configuration is maintained by means of the lower counter-weight 4 hang to the lateral appendage 18 while the upper counter-weight 4 is in an inoperative position in which the lateral appendage 18 is positioned at the lower part of the slot 20.

In the loading position of the brackets 3, the stop fins 13 of each bracket 3 rest on the horizontal surfaces 23 of the initial sections of the respective grooves 22, thus determining the lower stop position.

The operation of the column 1 according to the invention will be described hereinafter with reference to FIG. 6 wherein the lower bracket 3 of the pile will be named 3a, the intermediate one 3b and the upper one 3c.

When a first article is positioned on the lower bracket 3a, it rotates in the loading position due to the weight of the article actuating its upper counter-weight 4 connected to the overlying bracket 3b which in turn will be arranged in a pre-loading configuration. The lateral appendage 18 of the bracket 3b connected to its upper counter-weight 4 slides in the respective slot 20 ending up resting on the upper part of the slot 20.

When a second article is positioned on the bracket 3b, it rotates in the loading position actuating its upper counter-weight 4 which in turn carries the upper bracket 3c in pre-loading position.

This operation is repeated for each bracket 3 until all brackets 3 of the column 1 are loaded with the stacked article.

Unloading occurs in the reverse order starting from the highest bracket 3. When an article is unloaded from a bracket 3, it returns to the raised inoperative position by means of the lower counter-weight 4.

In other words, the lower counter-weight 4 of each bracket 3 has the dual function of actuator for rotating the bracket 3 from the inoperative position to the pre-loading position when an article is loaded onto the underlying bracket 3, and a return member for returning the bracket 3 from the loading position to the inoperative position once the article is removed.

In a preferred embodiment of the column 1 according to the invention, in order eliminate the clearances of the brackets 3 in their loading position, there can be provided a longitudinal bar 6 provided with a row of openings 7. Such bar 6 is arranged between one of the lateral walls of the body 2 and the corresponding containment sheet 5 so that a respective lateral appendage 18 of each bracket 3 is inserted into each of the openings 7. The bar 6 is designed to be able to slide vertically from a lowered inoperative position in which the lateral appendages 18 of the brackets 3 rest on the upper sections of the respective openings 7, to a raised operative position, in which the lateral appendage 18 of each bracket 3 rests on the lower part of the respective opening 7, thus locking the rotation of all brackets 3 in the lowered loading position. This is carried out when all brackets 3 of the pile are loaded with the respective articles: the bar 6 is made to vertically slide in the operative position, manually or by means of an actuation system connected to the upper bracket of the pile 3, simultaneously locking all brackets 3 and eliminating any clearances.

Figure 10:
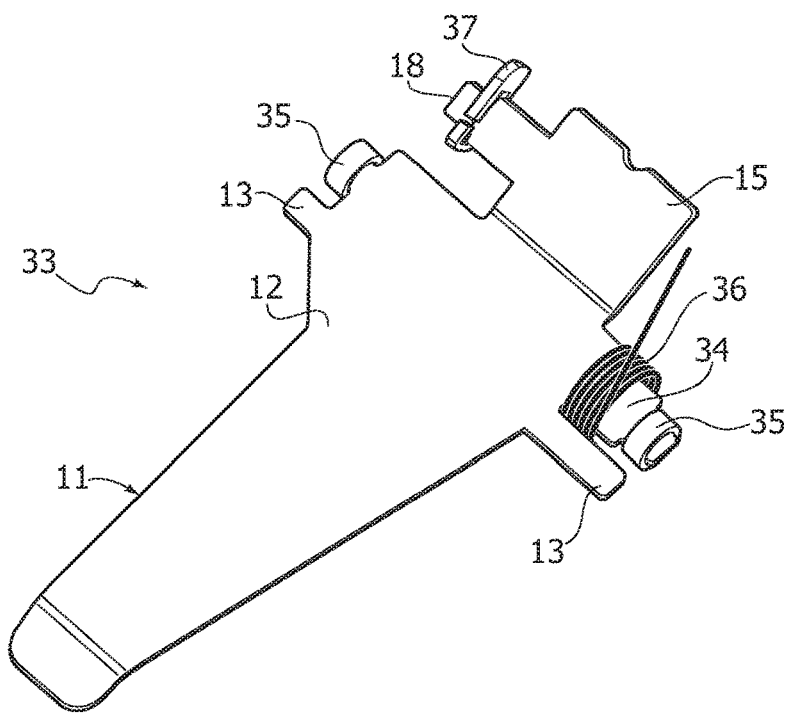
FIG. 10 shows a perspective view of a variant of the swingable bracket of FIG. 2.
Figure 11:
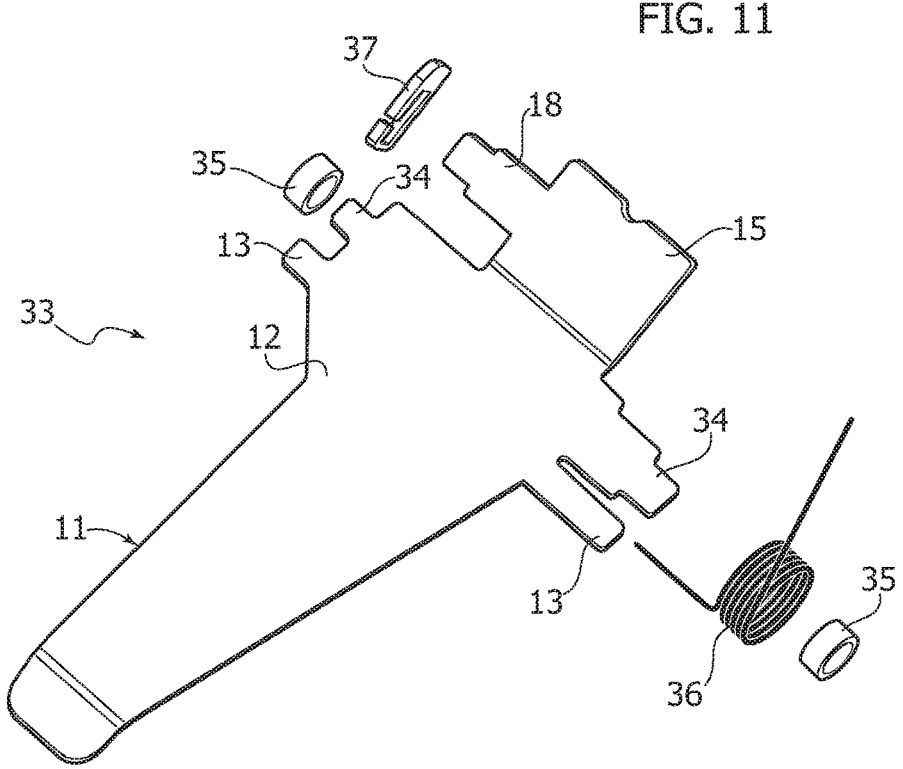
FIG. 11 is an exploded view of FIG. 10.

FIGS. 10 and 11, in which parts identical or similar to the ones described previously are indicated with the same reference numbers, show a possible variant of the swingable bracket, indicated with 33. In such variant, pivoting of the bracket 33 relative to the body 2 is carried out directly by means of a pair of bushings 34 fitted over a further pair of mutually coplanar lateral fins 34, projecting from the opposite sides of the central section 12. The bushings 35 are inserted within a respective pair of holes of the body 2.

In this variant, the actuator for controlling the rotation of the bracket 33 from the retracted position to the intermediate pre-loading position by a contiguous bracket, consists of a cam element 37 carried by the lateral appendage 18, and the return member of the bracket 33 towards the retracted inoperative position consists in a torsion spring 36 wound on one of the fins 34.

The column 1 thus described can be used together with at least one identical column, and preferably in an arrangement of four columns arranged at the vertices of a quadrilateral, in equipment for stacking and transporting piled-up articles such as for example vehicle body parts. Though, in the case of the illustrated embodiment, the column 1 is oriented vertically, with brackets that—in the extracted position—extend horizontally, alternative arrangements such as for example those in which the column is arranged horizontally, with the brackets that—in the extracted position—can extend horizontally or vertically, and even in which the column is inclined with the brackets that—in the extracted position—extend vertically, fall within the scope of protection of the present invention.

Obviously, the construction details and the embodiments may widely vary with respect to what has been described and illustrated, without departing from the scope of protection of the present invention as defined in the claims that follow. So, for example, the counter-weights 4 associated to the brackets 3 can be replaced by one or more traction springs tending to maintain the brackets 3 in the raised inoperative position.

The invention claimed is:

1. A column for equipment for stacking and transporting piled-up and separated articles, comprising:
   a channel-shaped body, a plurality of superimposed swingable brackets designed to support the articles, said brackets being formed by a front section for supporting the articles, a central section for coupling with said body and a rear section, each one of said brackets being pivoted to the body so as to be rotated between a retracted inoperative position, in which it is substantially contained inside the body, an intermediate pre-loading position, in which the front section of the bracket is partially projecting from the body to receive an article, and an extracted loading position in which said front section is projecting substantially transversely from said body to support the article, wherein the central section is provided with means for pivoting to the body and wherein there are provided for actuator means for controlling the rotation of the bracket from the retracted position to the intermediate pre-loading position by a contiguous bracket and means for returning the bracket towards the retracted inoperative position,
   the central section of each of the brackets having a pair of stop fins coplanar to the central section, each of the stop fins being inserted into a respective groove provided for on the body, said groove being formed by:
      an initial section with a substantially horizontal lower surface on which the stop fin rests in said loading position of the bracket,
      an end section with a vertical surface against which the stop fin rests in said inoperative position of the bracket, and a slanting chute intermediate section suitable to allow the stop fin to pass through—during the rotation of the bracket between said inoperative and loading positions, and the rear section of each of the brackets provided with at least one lateral appendage coupled to said actuator means.

2. A column according to claim 1, wherein said central section has a pair of ears projecting downwards and provided with holes for a pivot pin inserted into a respective pair of holes provided on the body and defining said pivot means.

3. A column according to claim 1, wherein said central section has a pair of coplanar fins projecting on opposite sides and bearing respective bushings inserted in a respective pair of holes (21) provided on the body (2) and defining said pivot means.

4. A column according to claim 2, wherein said actuator means and said return means comprise respective counter-weights.

5. A column according to claim 3, wherein said actuator means and said return means respectively comprise a cam member carried by said lateral appendage and a spring associated to one of said coplanar fins.

6. A column according to claim 4, wherein said return means comprise two counter-weights respectively lower and upper, and each counter-weight has an upper hole and a lower slot, wherein the lower counter-weight is connected to the lateral appendage of the bracket by means of the respective upper hole and to the lateral appendage of an underlying bracket by means of the respective lower slot, and the upper counter-weight is connected to the lateral appendage of the bracket by means of the respective lower slot and to the lateral appendage of an overlying bracket by means of the respective upper hole-.

7. A column according to claim 1, further comprising a longitudinal bar slidable in said body and having a row of openings which, in a raised locking position of said bar, are suitable to be engaged with said lateral appendages of the brackets so as to prevent the movement thereof.

8. A column according to claim 7, wherein said longitudinal bar is actuated by the contiguous bracket of the plurality of superimposed brackets.

9. A column according to claim 1, wherein the rear section of each of the brackets is inclined with respect to said central section.

10. A column according to claim 1, wherein the front section of each of the brackets is covered with an anti-skid and/or anti-scratch material.

11. Equipment for stacking and transporting piled-up articles, comprising at least two columns according to claim 1.

12. Equipment according to claim 11, wherein said columns are vertical and said brackets in said extracted position extend horizontally.

13. Equipment according to claim 11, wherein said columns are horizontal and said brackets in said extracted position extend horizontally.

14. Equipment according to claim 11, wherein said columns are horizontal and said brackets in said extracted position extend vertically.

15. Equipment according to claim 11, wherein said columns are inclined and said brackets in said extracted position extend vertically.

* * * * *